| United States Patent [19] | [11] Patent Number: 4,962,176 |
| Bujalski et al. | [45] Date of Patent: Oct. 9, 1990 |

[54] POLYSILANE PRECERAMIC POLYMERS

[75] Inventors: Duane R. Bujalski, Bay City; Gary E. DeGrow; Thomas F. Lim, both of Midland, all of Mich.

[73] Assignee: Dow Corning Corporation, Midland, Mich.

[21] Appl. No.: 945,126

[22] Filed: Dec. 22, 1986

[51] Int. Cl.$^5$ ............................................. C08G 77/06
[52] U.S. Cl. ...................................... 528/19; 528/21; 528/23; 528/25; 528/33; 556/430
[58] Field of Search ................... 556/430; 528/33, 25, 528/21, 23, 19

[56] References Cited

U.S. PATENT DOCUMENTS

Re. 31,447 11/1983 Baney et al. ........................ 528/29
4,298,559 11/1981 Baney et al. ........................ 528/29
4,310,651 1/1982 Baney et al. ........................ 528/23

*Primary Examiner*—Edward A. Miller

*Attorney, Agent, or Firm*—Robert L. McKellar

[57] ABSTRACT

Chlorine or bromine-containing polysilanes of the general formula $(R_2Si)(RSi)(R'Si)$ are disclosed. In these polysilanes there are also bonded to the silicon atoms other silicon atoms and chlorine or bromine atoms, R is an alkyl radical containing 1 to 4 carbon atoms, and R' is selected from the group consisting of alkyl radicals of at least six carbon atoms, phenyl radicals, and radicals of the formula $A_yX_{(3-y)}Si(CH_2)_z$— wherein each A is independently selected from a hydrogen atom or alkyl radicals containing 1 to 4 carbon atoms, y is an integer equal to 0 to 3, X is chlorine or bromine, and z is an integer greater than or equal to 1. These preceramic polymers can be pyrolyzed at elevated temperatures under an inert atmosphere to yield ceramic materials or articles. These polysilanes may also be converted into other preceramic polymers which can be pyrolyzed to ceramic materials or articles.

31 Claims, No Drawings

POLYSILANE PRECERAMIC POLYMERS

STATEMENT OF GOVERNMENT RIGHTS

The U.S. Government has rights in this invention pursuant to Contract Number F33615-83-C-5006 awarded by the U.S. Air Force.

BACKGROUND OF THE INVENTION

This invention relates to polysilanes which are useful as preceramic polymers in the preparation of ceramic materials and articles. This invention further relates to the methods of preparing such polysilanes as well as the ceramics prepared from such preceramic polymers.

Baney et al. in U.S. Pat. No. 4,310,651 (issued Jan. 12, 1982) disclosed a polysilane of general formula $(CH_3Si)((CH_3)_2Si)$ where there was present 0 to 60 mole percent $((CH_3)_2Si)$ units and 40 to 100 mole percent $(CH_3Si)$ units and where the remaining bonds on silicon were attached to other silicon atoms and chlorine atoms or bromine atoms. The polysilane was converted to a beta-silicon carbide containing ceramic material at elevated temperatures (about 1400° C.). The polysilanes of U.S. Pat. No. 4,310,651 generally are difficult to handle due to their high reactivity in air.

Baney et al. in U.S. Pat. No. 4,298,559 (issued Nov. 3, 1981) prepared polysilanes of general formula $(CH_3Si)((CH_3)_2Si)$ where there was present 0 to 60 mole percent $((CH_3)_2Si)$ units and 40 to 100 mole percent $(CH_3Si)$ units and where the remaining bonds on silicon were attached to other silicon atoms and additional alkyl radicals of 1 to 4 carbon atoms or phenyl radicals. Upon heating these polysilanes were converted into silicon carbide containing ceramics in high yields.

Baney et al. in U.S. Reissue Patent Re. 31,447 (reissued Nov. 22, 1983) disclosed polysilanes of the general formula $(CH_3Si)((CH_3)_2Si)$ where there was present 0 to 60 mole percent $((CH_3)_2Si)$ units and 40 to 100 mole percent $(CH_3Si)$ units and where the remaining bonds on silicon were attached to other silicon atoms and alkoxy radicals containing 1 to 4 carbon atoms or phenoxy radicals. Silicon carbide-containing ceramics were obtained by firing these polysilanes to elevated temperatures.

Baney et al. in U.S. Pat. No. 4,314,956 (issued Feb, 9, 1982) disclosed polysilanes of the general formula $(CH_3Si)((CH_3)_2Si)$ where there was present 0 to 60 mole percent $((CH_3)_2Si)$ units and 40 to 100 mole percent $(CH_3Si)$ units and where the remaining bonds on silicon were attached to silicon and amine radicals of the general formula $-NHR'''$ where $R'''$ is a hydrogen atom, an alkyl radical of 1 to 4 carbon atoms or a phenyl radical. A silicon carbide-containing ceramic was obtained by firing this polysilane to an elevated temperature under an inert atmosphere or under an ammonia atmosphere.

The just discussed U.S. Pat. Nos. 4,310,651, 4,298,599, Re 31,447, and 4,314 956 are hereby incorporated by reference. These polysilanes are further discussed in Baney et al. *Organometallics*, 2, 859 (1983).

Haluska in U.S. Pat. No. 4,546,163 (issued Oct. 8, 1985) which is hereby incorporated by reference prepared polysilanes of the average formula $(RSi)(R_2Si)(R''_d(CH_2=CH)Si)$ where there was present from 0 to 60 mole percent $(R_2Si)$ units, 30 to 99.5 mole percent $(RSi)$ units, 0.5 to 15 mole percent $(R''_d(CH_2=CH)Si)$ units, where the remaining bonds on silicon are attached to other silicon atoms and chlorine atoms or bromine atoms, where R is an alkyl radical containing from 1 to 4 carbon atoms, where $R''$ is an alkyl radical containing 1 to 4 carbon atoms, a vinyl radical, or a phenyl radical, and where d is 1 or 2. Polysilanes of the same average formula but containing additional alkyl, aryl, alkoxy, aryloxy, substituted amine, or unsubstituted amine radicals attached to silicon were also prepared. These polysilanes could be pyrolyzed at elevated temperatures in an inert atmosphere to produce silicon carbide-containing ceramics. The vinyl-containing polysilanes could be cured, and thus rendered infusible, prior to pyrolysis by exposure to ultraviolet light.

West in U.S. Pat. No. 4,260,780 (issued April 7, 1981) prepared a polysilane of general formula $((CH_3)_2Si)(CH_3(C_6H_5)Si)$ by the sodium metal reduction of dimethyldichlorosilane and methylphenylsilane. The resulting methylphenylpolysilanes had very high softening points (greater than 280° C.).

West et al. in *Polym. Prepr.*, 25, 4 (1984) disclosed the preparation of a polysilane of general formula $(CH_3(CH_2=CHCH_2)Si)(CH_3(C_6H_5)Si)$ by the sodium metal reduction of allylmethyldichlorosilane and methylphenyldichlorosilane. These polysilanes were rapidly gelled by irradiation with ultraviolet light.

What has been newly discovered are polysilanes of the general formula $(R_2Si)(RSi)(R'Si)$ where there are also bonded to the silicon atoms other silicon atoms and chlorine or bromine atoms, where R is an alkyl radical containing 1 to 4 carbon atoms, and where R+ is selected from the group consisting of alkyl radicals of at least six carbon atoms, phenyl radicals and radicals of the formula $A_yX_{(3-y)}Si(CH_2)_z$ wherein each A is independently selected from a hydrogen atom or alkyl radicals containing 1 to 4 carbon atoms, y is an integer equal to 0 to 3, X is chlorine or bromine and z is an integer greater than or equal to 1. These polysilane preceramic polymers can be pyrolyzed at elevated temperatures under an inert atmosphere to yield ceramic materials or articles. These polysilanes may also be converted into other preceramic polymers which can be pyrolyzed to ceramic materials or articles. These polysilanes represent a significant advance in the art of preparing ceramic materials or articles, especially in the art of preparing ceramic fibers.

THE INVENTION

This invention relates to polysilanes which are solid at 25° C. having the average formula $(R_2Si)(RSi)(R'Si)$ wherein each R is independently selected from alkyl radicals containing 1 to 4 carbon atoms, where R is selected from the group consisting of alkyl radicals of at least six carbon atoms, phenyl radicals, and radicals of the formula $A_yX_{(3-y)}Si(CH_2)_z-$ wherein each A is independently selected from a hydrogen atom or alkyl radicals containing 1 to 4 carbon atoms, y is an integer equal to 0 to 3, X is chlorine or bromine, and z is an integer greater than or equal to 1, and where there are from 0 to 40 mole percent (R'Si) units, 1 to 99 mole percent (RSi). and 1 to 99 mole percent (R'Si) units and wherein the remaining bonds on silicon are attached to either other silicon atoms, chlorine atoms, or bromine atoms.

This invention further relates to a method of preparing a polysilane of average formula $(R_2Si)(RSi)(R'Si)$ wherein each R is independently selected from alkyl radicals containing 1 to 4 carbon atoms where R' is selected from the group consisting of alkyl radicals of at least six carbon atoms, phenyl radicals, and radicals of the formula $A_yX_{(3-y)}Si(CH_2)z$— wherein each A is independently selected from a hydrogen atom or alkyl radicals containing 1 to 4 carbon atoms, y is an integer equal to 0 to 3, X is chlorine or bromine, and z is an integer greater than or equal to 1, where there are from 0 to 40 mole percent ($R_2Si$) units, 1 to 99 mole percent (RSi), and 1 to 99 mole percent (R'Si) units, and wherein the remaining bonds on silicon are attached to either other silicon atoms, chlorine atoms, or bromine atoms, where such method consists of treating a mixture containing a chlorine-containing or bromine-containing disilane and 1 to 30 weight percent of a monoorganosilane of formula $R'SiX_3$, where R' is selected from the group consisting of alkyl radicals of at least six carbon atoms, phenyl radicals, and radicals of the formula $A_yX_{(3-y)}Si(CH_2)_z$—wherein each A is independently selected from a hydrogen atom or alkyl radicals containing 1 to 4 carbon atoms, y is an integer equal to 0 to 3, X is chlorine or bromine, and z is an integer greater than or equal to 1 with 0.001 to 10 weight percent of a rearrangement catalyst at a temperature of 100° C. to 340° C. while distilling by-produced volatile materials until there is produced a polysilane, which is a solid at 25° C. having the average formula $(R_2Si)(RSi)(R'Si)$ where R is an alkyl radical containing 1 to 4 carbon atoms, where R' is selected from the group consisting of alkyl radicals of at least, six carbon atoms, phenyl radicals and radicals of the formula $A_yX_{(3-y)}Si(CH_2)_z$wherein each A is independently selected from a hydrogen atom or alkyl radicals containing 1 to 4 carbon atoms, y is an integer equal to 0 to 3, X is chlorine or bromine, and z is an integer greater than or equal to 1, and where there are from 0 to 40 mole percent ($R_2Si$) units, 1 to 99 mole percent (RSi), and 1 to 99 mole percent (R'Si) units and wherein the remaining bonds on silicon are attached to either other silicon atoms chlorine atoms, or bromine atoms.

The polysilanes of this invention are described by the average unit formula $(R_2Si)(RSi)(R'Si)$ wherein each R is independently selected from alkyl groups containing 1 to 4 carbon atoms, where R' is selected from the group consisting of alkyl radicals of at least six carbon atoms, phenyl radicals, and radicals of the formula $A_yX_{(3-y)}Si(CH_2)_z$wherein each A is a hydrogen atom or alkyl radicals containing 1 to 4 carbon atoms, y is an integer equal to 0 to 3, X is chlorine or bromine, and z is an integer greater than or equal to 1 and where there are from 0 to 40 mole percent ($R_2Si$) units. 1 to 99 mole percent ($CH_3Si$) units and 1 to 99 mole percent (R'Si) units wherein the remaining bonds on silicon are attached to either other silicon atoms, chlorine atoms, or bromine atoms. These are chlorine- or brominecontaining polysilanes where the remaining bonds on silicon are attached to other silicon atoms and chlorine atoms or bromine atoms. Preferably these chlorine- or bromine-containing polysilanes contain from 0 to 40 mole percent ($R_2Si$) units. 40 to 99 mole percent ($CH_3Si$) units, and 1 to 30 mole percent (R'Si) units. It is most preferred that these chlorine- or bromine-containing polysilanes contain C to 10 mole percent ($R_2Si$) units, 80 to 99 mole percent (RSi) units, and 1 to 20 mole percent (R'Si) units. The chlorine-containing polysilanes are preferred in the practice of this invention.

Especially preferred polysilanes are described by the average formula $((CH_3)_2Si)(CH_3Si)(R'Si)$ where R' is selected from the group consisting of alkyl radicals of at least six carbon atoms, phenyl radicals, and radicals of the formula $A_yX_{(3-y)}Si(CH_2)_z$—wherein each A is independently selected from a hydrogen atom or alkyl radicals containing 1 to 4 carbon atoms, y is an integer equal to 0 to 3, X is chlorine or bromine, and z is an integer greater than or equal to 1 and where there are from 0 to 40 mole percent (($CH_3)_2Si$) units, 1 to 99 mole percent ($CH_3Si$) units, and 1 to 99 mole percent (R'Si) units wherein the remaining bonds on silicon are attached to either another silicon atom or a chlorine atom. Preferably these chlorine- or bromine-containing methylpolysilanes contain from 0 to 40 mole percent ($R_2Si$) units, 40 to 99 mole percent ($CH_3Si$) units, and 1 to 30 mole percent (R'Si) units. It is most preferred that these chlorine- or bromine-containing methylpolysilanes contain 0 to 10 mole percent (($CH_3)_2Si$) units, 80 to 99 mole percent ($CH_3Si$) units, and 1 to 20 mole percent (R'Si) units.

The newly discovered polysilanes may be prepared by reacting a mixture of about 40–99 weight percent of one or more chlorine-containing or bromine-containing disilanes and 1 to 60 weight percent of one or more monoorganosilanes of formula $R'SiX_3$ where R' is selected from the group consisting of alkyl radicals of at least six carbon atoms, phenyl radicals, and radicals of the formula $A_yX_{(3-y)}Si(CH_2)_z$wherein each A is independently selected from a hydrogen atom or alkyl radicals containing 1 to 4 carbon atoms y is an integer equal to 0 to 3, X is chlorine or bromine, and z is an integer greater than or equal to 1, with 0.001 to 10 weight percent of a rearrangement catalyst at a temperature of 100° C. to 340° C. while distilling by-produced volatile materials. Preferably the newly discovered polysilanes are prepared by reacting a mixture of about 70–99 weight percent of one or more chlorine-containing or bromine-containing disilanes and 1 to 30 weight percent of one or more monoorganosilanes of formula R'SiX, where R' is selected from the group consisting of alkyl radicals of at least six carbon atoms, phenyl radicals, and radicals of the formula $A_yX_{(3-y)}Si(CH_2)_z$—wherein each A is independently selected from a hydrogen atom or alkyl radicals containing 1 to 4 carbon atoms, y is an integer equal to 0 to 3, X is chlorine or bromine, and z is an integer greater than or equal to 1, with 0.001 to 10 weight percent of a rearrangement catalyst at a temperature of 100° C. to 340° C. while distilling by-produced volatile materials.

The chlorine-containing or bromine-containing disilanes used to prepare the polysilanes are of the general formula $(R_bX_cSi)_2$ wherein R is an alkyl radical containing from 1 to 4 carbon atoms, b has a value of 0 to 2.5, c has a value of 0.5 to 3, the sum (b+c) equals three and X is chlorine or bromine, R in the above disilane may be methyl, ethyl, propyl or butyl. Examples of such disilanes include $CH_3Cl_2SiSiCl(CH_3)_2$, $CH_3Cl_2SiSiCl_2CH_3$, $CH_3Br_2SiSiBr(CH_3)_2$, $CH_3Br_2SiSiBr_2CH_3$ and the like. Preferably in the above disilane R is a methyl radical and X is chlorine. The disilane can be prepared from the appropriate silanes or the disilane can be utilized as it is found as a component of the process residue from the direct synthesis of organochlorosilanes. The direct synthesis of organochlorosilanes involves passing the vapor of an organic chloride over heated silicon and a catalyst. See Eaborn "Organosilicon Compounds," *Butterworths Scientific Publications*, 1960, page 1. The disilanes $CH_3Cl_2SiSiCl_2CH_3$ and $(CH_3)_2ClSiSiCl_2CH_3$ are found in large quantities in the residue from the reaction and, therefore, this Direct Process residue is a good starting material for obtaining the polysilane polymer used in this invention.

The monoorganosilanes used to prepare the polysilanes of this invention are of formula R'SiX$_3$ where R' is selected from the group consisting of alkyl radicals of at least six carbon atoms, phenyl radicals, and radicals of the formula A$_y$X$_{(3-y)}$Si(CH$_2$)$_z$—wherein each A is independently selected from a hydrogen atom or alkyl radicals containing 1 to 4 carbon atoms, y is an integer equal to C to 3, X is chlorine or bromine, and z is an integer greater than or equal to 1. The A radicals in the formula A$_y$X$_{(3-y)}$Si(CH$_2$)$_z$—may be the same or different, Generally the monoorganosilane should have a boiling point of about 180° C. or greater at one atmosphere. Such a high boiling point reduces the possibility of the monoorganosilane being removed from the reaction mixture before it can be incorporated into the polysilane. Examples of suitable monoorganosilanes include phenyltrichlorosilane, n-hexyltrichlorosilane n-octyltrichlorosilane phenyltribromosilane, n-octyltribromosilane, Cl$_3$SiCH$_2$CH$_2$SiCl$_3$, CH$_3$Cl$_2$SiCH$_2$CH$_2$SiCl$_3$, (CH$_3$)$_2$ClSiCH$_2$CH$_2$SiCl$_3$, H(CH$_3$)$_2$SiCH$_2$CH$_2$SiCl$_3$, and the like. Phenyltrichlorosilane and n-octyltrichlorosilane are the preferred monoorganosilanes.

Mixtures of such monoorganosilanes may also be used. Indeed, mixtures of monoorganosilanes are generally preferred in the practice of this invention. One especially preferred mixture of monoorganosilanes contains n-octyltrichlorosilane and phenyltrichlorosilane. The use of such monoorganosilanes, either singly or in mixtures, appears to allow for control of both the softening or glass transition temperatures of the polysilanes and other preceramic polymers prepared from the polysilanes and the relative silicon and carbon content of the ceramic materials produced from the polysilanes and other preceramic polymers prepared from the polysilanes. The preceramic polymers prepared from the polysilanes of this invention are described in detail in copending Patent Applications entitled "Alkylpoly(polysilyl)azane Preceramic Polymers" and "Derivatized Alkylpolysilane Preceramic Polymers" which were filed on the same date as this present application and which are hereby incorporated by reference. This control is achieved by a variation of the (R'Si) content in the polysilanes of this invention. In general it appears that increasing the (R'Si) content of the preceramic polymers results in a reduction in the glass transition temperature. Incorporation of (n-octyl-Si) units allows for a significant reduction of the glass transition temperature with the amount of the reduction being dependent on the level of (n-octyl-Si) units in the preceramic polymer. Incorporation of (phenyl-Si) units also results in a decrease in the glass transition temperature but the observed effect is generally less than for incorporation of (n-octyl-Si) units. Upon pyrolysis of the preceramic polymers containing (n-octyl-Si) units, it appears that the n-octyl group is lost from the ceramic material as an olefin thereby leaving the ceramic material carbon deficient relative to ceramic materials prepared from similar polymers without (n-octyl-Si) units. It is expected that other alkyl groups containing at least six carbon atoms will behave in a similar manner. Phenyl groups are generally not lost upon pyrolysis. Therefore. pyrolysis of the preceramic polymers containing (phenyl-Si) units allows more carbon to be incorporated into the final ceramic material and therefore produces ceramic materials that are carbon rich relative to ceramic materials prepared from similar polymers without (phenyl-Si) units. Thus by incorporation of (R'Si) units where R' is n-octyl and phenyl, the relative silicon and carbon content of the resulting ceramic materials can be controlled to a large extent. It is possible by the practice of this invention to prepare ceramic materials containing SiC with either excess carbon or excess silicon as well as stoichiometric amounts of silicon and carbon. Methyl radicals in the form of (CH$_3$Si) or ((CH$_3$Si)$_2$Si) units are generally not lost on pyrolysis. Therefore the relative amounts of silicon and carbon will also depend in part on the presence of the other units in the polysilane but the incorporation of (n-octyl-Si) and (phenyl-Si) units can be used to "fine tune" the relative silicon and carbon content of the ceramics.

The disilane and monoorganosilane mixtures are reacted in the presence of a rearrangement catalyst. Mixtures containing several disilanes and/or several monoorganosilanes may also be used. Suitable rearrangement catalysts include ammonium halides, tertiary organic amines, quaternary ammonium halides, quaternary phosphonium halides, hexamethylphosphoramide and silver cyanide. Preferred catalyst includes quaternary ammonium halide having the formula W$_4$NX', quaternary phosphonium halides having the formula W$_4$PX', and hexamethylphosphoramide where W is an alkyl or aryl radical and X' is a halogen. Preferably W is an alkyl radical containing 1 to 6 carbon atoms or a phenyl radical and X' is chlorine or bromine. One especially preferred catalyst is tetra-n-butylphosphonium bromide.

The amount of catalyst utilized can range from 0.001 to 10 weight percent and preferably from 0.1 to 2.0 weight percent based on the Weight of the starting disilane/monoorganosilane mixture. The catalysts and starting materials require anhydrous conditions and therefore one must take care to insure that moisture is excluded from the reaction system when the reactants are mixed. Generally this can be done by using a stream of dry nitrogen or argon as a blanket over the reaction mixture.

The mixture of about 40 to 99 weight percent disilane or disilanes and 1 to 60 weight percent monoorganosilane or monoorganosilanes are reacted in the presence of 0.001 to 10 weight percent of a rearrangement catalyst at a temperature of 100° C. to 340° C. while distilling by-produced volatile materials until there 1s produced the chlorinecontaining or bromine-containing polysilane of this invention. Preferably the reaction mixture contains 70 to 99 weight percent disilane or disilanes and 1 to 30 weight percent monoorganosilane or monoorganosilanes and most preferably it contains 80 to 98 weight percent disilanes or disilanes and 2 to 20 weight percent monoorganosilane or monoorganosilanes. The order of mixing the reactants is no&: critical. Preferably the reaction temperature is from 150° C to 300° C. When the final reaction temperature is higher than the boiling point of the monoorganosilane, it is preferred that the reaction temperature be raised slowly to the final temperature so that the monoorganosilane will have a greater tenancy to incorporate into the polymer as opposed to simply distilling out of the reaction mixture. The incorporation of the monoorganosilane may also be increased by removing the volatile by-products only in the later stages of the reaction. Typically the reaction is carried out for about 1 to 48 hours although other time durations may be employed.

The polysilanes of this invention may be converted to ceramic materials by pyrolysis to an elevated temperature of at least 750° C. in an inert atmosphere, vacuum or ammonia containing atmosphere for a time sufficient to convert them to a ceramic material. Preferably the pyrolysis temperature is from about 1000° C. to about 1600° C. If the preceramic polymers are of sufficient viscosity or if they possess a sufficiently low melt temperature, they can be shaped and then pyrolyzed to give a ceramic shaped article such as a fiber. Preferably the preceramic polymer of this invention have a softening temperature of about 50° C. to 300° C. and most preferably in the range of 70° C. to 200° C. Such a softening temperature allows for the formation of preceramic fibers by known spinning techniques.

The chlorine- or bromine-containing polysilanes of this invention may also be used to prepare other preceramic polymers as described in copending Patent Applications entitled "Alkylpoly(polysilyl)azane Preceramic Polymers" and "Derivatized Alkylpolysilane Preceramic Polymers" which were filed on the same date as this present application.

So that those skilled in the art can better appreciate and understand the invention, the following examples are given. Unless otherwise indicated, all percentages are by weight. The examples are intended to illustrate the invention and are not intended to limit the invention.

In the following examples, the analytical methods used were as follows:

The glass transition temperature. $T_g$, was determined on a Thermomechanical Analyzer. Model 1090, from Dupont Instruments. The glass transition temperature is related to the softening point.

Carbon, hydrogen, and nitrogen were determined on a C, H, N Elemental Analyzer Model 1106, manufactured by Carlo Erba Strumentazione of Italy. The sample was combusted at 1030° C. and then passed over a chromium oxide bed at 650° C. and a copper bed at 650° C. The $N_2$, and $H_2O$ produced were then separated and detected using a thermal conductivity detector.

Percent silicon was determined by a fusion technique which consisted of converting the silicon material to soluble forms of silicon and then analyzing the soluble material quantitatively for total silicon by atomic absorption spectrometry. Percent chlorine was determined by fusion of the sample with sodium peroxide and potentiometric titration with silver nitrate. Oxygen was determined using a Leco Oxygen Analyzer equipped with an Oxygen Determinater 316 (Model 783700) and an Electrode Furnace EF100 (Model 77600) manufactured by Leco Corporation. St. Joseph. Mich. The oxygen method involves the high temperature carbothermic reduction to CO with CO analysis by IR.

Thermogravimetric analyses (TGA) were carried out on a Netzsch STA 429 (2400° C.) TGA instrument manufactured by Netzsch Instruments. Selb. West Germany.

The preceramic polymers were fired to elevated temperature using an Astro Industries Furnace 1000A (water cooled graphite heated model 1000.3060-FP-12). a Lindberg furnace (Heavy Duty SB Type S4877A). or the TGA instrument.

EXAMPLE 1.

This example demonstrates the preparation of a chlorine-containing methylpolysilane with ($C_6H_5Si$) units. The source of the disilanes was a Direct Process residue which contained about 9.0 percent (($CH_3)_2ClSi)_2$, 32.9 percent ($CH_3Si)_2ClSiSiCl_2CH_3$, 57.3 percent ($CH_3Cl_2Si)_2$, and 0.8 percent low boiling chlorosilanes. In sample A, the disilanes (2120.5 g. 9.7 moles) and 52.5 g (0.25 moles) of phenyltrichlorosilane was reacted in the presence of 20.0 g tetra-n-butylphosphonium chloride by heating the reaction mixture from room temperature to 250° C. at a rate of 2.0° C./min and holding at 250° C. for 45 minutes while removing volatile by-products by distillation. In sample B. the disilanes (2101.0 g. 9.6 moles) and 157.5 g (0.75 moles) of phenyltrichlorosilane was reacted in the presence of 20.0 g tetra-n-butylphosphonium chloride by heating the reaction mixture from room temperature to 250° C. at a rate of 2.0° C./min and holding at 250° C. for 60 minutes while removing volatile by-products by distillation. About 304.1 g and 320.6 g of the chlorine-containing polysilanes A and B, respectively were obtained. The chlorine containing polysilane A contained 39.9 percent silicon 29.5 percent carbon 6.03 percent hydrogen, and 0.22 percent oxygen. The chlorine content was not determined. The chlorine-containing polysilane B contained 0.45 percent oxygen. The chlorine-containing polysilane A was converted to a ceramic material in 54.6 percent yield by pyrolysis to 1200° C. by heating the sample from room temperature to 1200° C. at a rate of 5.0° C./min and holding at 1200° C. for two hours under an argon atmosphere. The ceramic material from A contained 70.4 percent silicon, 22.4 percent carbon, and 2.2 percent oxygen. Chlorine was not determined.

EXAMPLE 2

This example demonstrates the preparation of a chlorine-containing methylpolysilanes with ($CH_3(CH_2)_5Si$) units using the same general procedure as Example 1. The same disilanes (436 g, 2.0 moles) as in Example 1 and n-hexyltrichlorosilane (15.6 g. 0.1 moles) were reacted in the presence of 4.4 g tetra-n-butylphosphonium bromide by heating the reaction mixture from room temperature to 110° C. at a rate of 8.0° C./min, holding at 110° C. for 20 minutes, and heating from 110 to 250° C. at 2.0° C./min while removing volatile by-products by distillation. After the reaction temperature reached 250° C. the heating was discontinued and a 30 torr vacuum was applied for 10 minutes to remove any residual, volatile components. About 60 g of the chlorine-containing polysilane was obtained. The polysilane was soluble in toluene and had a glass transition temperature of 120.8° C. The chlorine-containing polysilane contained 47.1 percent silicon, 25.8 percent carbon, 6.31 percent hydrogen 17.48 percent chlorine, and 0.86 percent oxygen. The chlorine-containing polysilane was converted to a ceramic material in a 50.0 percent yield by pyrolysis to 1200° C. at a rate of 3.0° C./min under an argon atmosphere. The ceramic material contained 71.0 percent silicon 24.3 percent carbon, no detectable hydrogen, < 1.0 percent chlorine, and 1.26 percent oxygen.

EXAMPLE 3

This example demonstrates the preparation of a chlorine-containing methylpolysilanes with ($CH_3(CH_2)_7Si$) units and ($C_6H_5Si$) units using the same general procedure as Example 1. The same disilanes (436 g. 2.0 moles) as in Example 1, n-octyltrichlorosilane (5.0 g, 0.2 moles), and phenyltrichlorosilane (21.1 g. 0.1 moles) were reacted in the presence of 4.6 g tetra-n-butylphosphonium bromide by heating the reaction mixture from room temperature to 250° C. at a rate of 1.5° C./min while removing volatile by-products by distillation. The resulting chlorine-containing polysilane was dissolved in toluene, filtered, and stripped at 230° C. and 20 torr for 15 minutes and was obtained in a 60.2 g yield. The final, chlorine-containing polysilane was soluble in toluene and had a glass transition temperature of 111.5° C. The chlorine-containing polysilane contained 42.0 percent silicon 29.8 percent carbon, 6.13 percent hydrogen 9.6 percent chlorine and 1.62 percent oxygen. The chlorine-containing polysilane was converted to a ceramic material as in Example 2 in a 51.6 percent yield. The ceramic material contained 64.8 percent silicon, 22.8 percent carbon. <1.0 percent hydrogen <1.0 percent chlorine, and 3.91 percent oxygen.

EXAMPLE 4

A chlorine containing polysilane with ($C_6H_5Si$) units was prepared by reacting 22.8 g (0.1 moles) $CH_3Cl_2SiSiCl_2CH_3$ and 21.25 g (0.1 moles) phenyltrichlorosilane in the presence of 0.23 g tetra-n-butylphosphonium bromide by heating the reaction mixture to 170° C. at a rate of 1.6° C./min and holding the temperature at 170° C. for 7 minutes while collecting volatile by products removed by distillation. The chlorine-containing polysilane was vacuum stripped at 170° C. and 1.0 torr for about 15 minutes. About 8.1 g of chlorinecontaining polysilane was obtained. The volatile by-products from the reaction and stripping process were combined and analyzed by gas-liquid chromatography (glc). The volatile by-products contained 0.186 moles $CH_3SiCl_3$, O moles disilane, and 0.033 moles $C_6H_5SiCl_3$. Based on these results it appears that about 67 percent of the phenyltrichlorosilane was incorporated into the chlorine-containing polysilane in the form of ($C_6H_5Si$) units. Based on the quantities of starting materials and volatile materials found in the distillate, an empirical formula of $(CH_3Si)(C_6H_5Si)_aCl_b$ where a and b equal 5.1 and 3.0. respectively, may be calculated. The calculated chlorine content is 33.2 percent.

EXAMPLE 5

Several chlorine-containing polysilanes containing ($CH_3Cl_2SiCH_2CH_2Si$) were prepared. Sample A was prepared by reacting 22.8 g (0.1 moles) $CH_3Cl_2SiSiCl_2CH_3$ and 27.6 g (0.1 moles) $CH_3Cl_2SiCH_2CH_2SiCl_3$ in the presence of 0.23 g tetra-n-butylphosphonium bromide by heating the reaction mixture to 280° C. at a rate of 1.2 C./min while collecting volatile by-products removed by distillation. The chlorine-containing polysilane was vacuum stripped at 220° C. and 1.0 torr for about 6 minutes. About 11.41 g of chlorinecontaining polysilane was obtained. The volatile by-products from the reaction and stripping process were combined and analyzed by glc. The volatile by-products contained 0.182 moles $CH_3SiCl_3$, 0.003 moles disilane, and 0.032 moles $CH_3Cl_2SiCH_2CH_2SiCl_3$. Based on these results it appears that about 68 percent of the $CH_3Cl_2SiCH_2CH_2SiCl_3$ was incorporated into the chlorine-containing polysilane in the form of ($CH_3Cl_2SiCH_2CH_2Si$) units. An empirical formula of $CH_3Si)(CH_3Cl_2SiCH_2CH_2Si)_a Cl_b$ where a and b equal 5.4 and 14.5, respectively may be calculated. The calculated chlorine content is 32.3 percent.

Sample B was prepared in a similar manner by reacting 171 g (0.75 moles) $CH_3Cl_2SiSiCl_2CH_3$ and 138 g (0.5 moles) $CH_3Cl_2SiCH_2CH_2SiCl_3$ in the presence of 1.4 g tetra-n-butylphosphonium bromide by heating the reaction mixture to 310° C. at a rate of 1.28° C./min while collecting volatile by-products removed by distillation. The polymer was stripped to remove any additional volatiles. About 79.5 g of chlorine-containing polysilane was obtained. The volatile were analyzed as above and found to contain 1.50 moles $CH_3SiCl_3$, O moles disilane, and 0.030 moles $CH_3Cl_2SiCH_2CH_2SiCl_3$. Based on these results it appears that about 94 percent of the $CH_3Cl_2SiCH_2CH_2SiCl_3$ was incorporated into the chlorine-containing polysilane in the form of ($CH_3Cl_2SiCH_2CH_2Si$) units. An empirical formula of $(CH_3Si)(CH_3Cl_2SiCH_2CH_2Si)_aCl_b$ where a and b equal 129 and 235, respectively, may be calculated. The calculated chlorine content is 39.6 percent.

EXAMPLE 6

A chlorine-containing polysilane containing (($CH_3)_2ClSiCH_2CH_2Si$) was prepared by reacting 39.9 g (0.175 moles) $CH_3Cl_2SiSiCl_2CH_3$, and 25.6 g (0.1 moles) ($CH_{32}ClSiCH_2CH_2SiCl_3$ in the presence of 0.40 g tetra-n-butylphosphonium bromide by heating the reaction mixture to 330° C. at a rate of 5.0° C./min using the same procedures as Example 5. About 15.73 g of chlorine-containing; polysilane was obtained. The volatile by-products contained 0.30 moles $CH_3SiCl_3$, 0.004 moles disilane, and 0.012 moles $(CH_3)_2ClSiCH_2CH_2SiCl_3$. Based on these results it appears that about 88 percent of the $(CH_3)_2ClSiCH_2CH_2SiCl_3$ was incorporated into the chlorine-containing polysilane in the form of $(CH_3)_2ClSiCH_2CH_2Si$) units. An empirical formula of $(CH_3Si)((CH_3)_2ClSiCH_2CH_2Si)_aCl_b$ where a and b equal 2.1 and 3.2, respectively may be calculated. The calculated chlorine content is 28.6 percent.

EXAMPLE 7

A chlorine-containing polysilane containing ($Cl_3SiCH_2CH_2Si$) was prepared by reacting 22.8 g (0.1 moles) $CH_3Cl_2SiSiCl_2CH_3$ and 29.7 g (0.1 moles) $Cl_3SiCH_2CH_2SiCl_3$ in the presence of 0.23 g tetra-n-butylphosphonium bromide by heating the reaction mixture to 300° C. at a rate of 4.4° C./min using the same procedures as Example 5. About 8.2 g of chlorine-containing polysilane was obtained. The volatile by-products contained 0.19 moles $CH_3SiCl_3$, 0.003 moles disilane, and 0.05 moles ($CH_{32}ClSiCH_2CH_2SiCl_3$. Based on these results it appears that about 50 percent of the $Cl_3SiCH_2CH_2SiCl_3$ was incorporated into the chlorine-containing polysilane in the form of ($Cl_3SiCH_2CH_2Si$) units. An empirical formula of ($Cl_3SiCH_2CH_2Si)_aCl_b$ where a and b equal 1.0 and 2.1, respectively, may be calculated. The calculated chlorine content is 46.9 percent.

EXAMPLE 8

This example is presented for comparison purposes only. Several attempts were made to incorporate (($CH_3)_2CHCH_2Si$) units into a chlorine-containing polysilane. The process of this invention generally resulted in a relatively low percent incorporation. In sample A. 22.8 g (0.1 moles) $CH_3Cl_2SiSiCl_2CH_3$ and 19.2 g (0.1 moles) $(CH_3)_2CHCH_2SiCl_3$ in the presence of 0.23 g tetra-n-butylphosphonium bromide by heating the reaction mixture to 240° C. at a rate of 2.4° C./min using the same procedures as Example 5. Only about 50 percent of the $(CH_3)_2CHCH_2SiCl_3$ was incorporated as (($CH_3)_2CHCH_2Si$) units in the polysilane. In sample B, 39.9 g (0.175 moles) $CH_3Cl_2SiSiCl_2CH_3$ and 19.2 g (0.1 moles) $(CH_3)_2CHCH_2SiCl_3$ in the presence of 0.40 g tetra-n-butylphosphonium bromide by heating the reaction mixture to 422° C. at a rate of 7.4° C./min using the same procedures as Example 5. Only about 17 percent of the $(CH_3)_2CHCH_2SiCl_3$ was incorporated as $((CH_3)_2CHCH_2Si)$ units in the polysilane. In sample C, 68.4 g (C.3 moles) $CH_3Cl_2SiSiCl_2CH_3$ and 38.3 g (0.2 moles) $(CH_3)_2CHCH_2SiCl_3$ in the presence of 0.68 g tetra-n-butylphosphonium bromide by heating the reaction mixture to 400° C. at a rate of 6.2° C./min using the same procedures as Example 5. Only about 12 percent of the $(CH_3)_2CHCH_2SiCl_3$ was incorporated as $((CH_3)_2CHCH_2Si)$ units in the polysilane.

That which is claimed:

1. A polysilane, which is solid at 25° C. having the average unit formula $(R_2Si)(RSi)(R'Si)$ wherein each R is independently selected from alkyl radicals containing 1 to 4 carbon atoms, wherein each R' is independently selected from the group consisting of alkyl radicals of at least six carbon atoms, phenyl radicals, and radicals of the formula $A_yX_{(3-y)}Si(CH_2)_z$—where A is a hydrogen atom or an alkyl radical containing 1 to 4 carbon atoms, y is an integer equal to 0 to 3, X is chlorine or bromine, and z is an integer greater than or equal to 1, and where there are from 0 to 40 mole percent $(R_2Si)$ units, 1 to 99 mole percent (RSi). and 1 to 99 mole percent (R'Si) units and wherein the remaining bonds on silicon are attached to either other silicon atoms, chlorine atoms, or bromine atoms.

2. A polysilane as claimed in claim 1 wherein there are from 0 to 40 mole percent $(R_2Si)$ units. 40 to 99 mole percent RSi) units, and 1 to 30 mole percent (R'Si) units.

3. A polysilane as claimed in claim 2 wherein R is a methyl radical and the remaining bonds on silicon are attached to either other silicon atoms or chlorine atoms.

4. A polysilane as claimed in claim 3 wherein R' is an alkyl radical containing at least six carbon atoms.

5. A polysilane as claimed in claim 4 wherein R' is an n-hexyl radical.

6. A polysilane as claimed in claim 4 wherein R' is an n-octyl radical.

7. A polysilane as claimed in claim 3 wherein R' is a phenyl radical.

8. A polysilane as claimed in claim 3 wherein R' is a radical of the formula $A_yX_{(3-y)}Si(CH_2)_z$— wherein A is independently selected from a hydrogen atom or alkyl radicals containing 1 to 4 carbon atoms, y is an integer equal to 0 to 3, X is chlorine or bromine, and z is an integer greater than or equal to 1.

9. A polysilane as claimed in claim 2 wherein the polysilane contains both (n-octyl-Si) units and (phenyl-Si) units.

10. A polysilane as claimed in claim 3 wherein the polysilane contains both (n-octyl-Si units and (phenyl-Si) units.

11. A polysilane as claimed in claim 2 wherein there is from 0 to 10 mole percent $(R_2Si)$ units, 80 to 99 mole percent (RSi) units, and 1 to 20 mole percent (R'Si) units.

12. A polysilane as claimed in claim 9 wherein there is from 0 to 10 mole percent $(R_2Si)$ units. 80 to 99 mole percent (RSi) units, and 1 to 20 mole percent (n-octyl-Si) units and (phenyl-Si) units.

13. A polysilane as claimed in claim 10 wherein there is from 0 to 10 mole percent $(R_2Si)$ units, 80 to 99 mole percent (RSi) units, wherein R is a methyl radical, abnd 1 to 20 mole percent of combined (n-octyl-Si) units and (phenyl-Si) units.

14. A method of preparing a polysilane having average unit formula $(R_2Si)(RSi)(R'Si)$ wherein each R is independently selected from alkyl radicals containing 1 to 4 carbon atoms, wherein each R' is independently selected from the group consisting of alkyl radicals of at least six carbon atoms, phenyl radicals, and radicals of the formula $A_yX_{(3-y)}Si(CH_2)_z$— wherein each A independently selected from is a hydrogen atom or alkyl radicals containing 1 to 4 carbon atoms, y is an integer equal to 0 to 3, X is chlorine or bromine, and z is an integer greater than or equal to 1, 1 wherein there are from 0 to 40 mole percent $(R_2Si)$ units, 1 to 99 mole percent (RSi) units, and 1 to 99 mole percent (R'Si) units, and where the remaining bonds on silicon are attached to either other silicon atoms, chlorine atoms, or bromine atoms, wherein such method comprises treating a mixture containing a chlorine-containing or bromine-containing disilane and 1 to 60 weight percent of a monoorganosilane of formula $R'SiX_3$, where R' is selected from the group consisting of alkyl radicals of at least six carbon atoms, phenyl radicals and radicals of the formula $A_yX_{(3-y)}Si(CH_2)_z$— wherein each A is independently selected from a hydrogen atom or alkyl radicals containing 1 to 4 carbon atoms, y is an integer equal to 0 to 3, X is chlorine or bromine, and z is an integer greater than or equal to 1, with 0.001 to 10 weight percent of a rearrangement catalyst at a temperature of 100° C. to 340° C. while distilling by-produced volatile materials until there is produced a polysilane, which is a solid at 25° C. having the average formula $(R_2Si)(RSi)(R'Si)$ wherein each R is independently selected from alkyl radicals containing 1 to 4 carbon atoms, where R' is selected from the group consisting of alkyl radicals of at least six carbon atoms, phenyl radicals,and radicals of the formula $A_yX_{(3-y)}Si(CH_2)_z$— wherein each A is independently selected from a hydrogen atom or alkyl radicals containing 1 to 4 carbon atoms, y is an integer equal to 0 to 3, X is chlorine or bromine, and z is an integer greater than or equal to 1. and where there are from 0 to 40 mole percent $(R_2Si)$ units, 1 to 99 mole percent (RSi) units, and 1 to 99 mole percent (R'Si) units and wherein the remaining bonds on silicon are attached to either other silicon atoms, chlorine atoms, or bromine atoms.

15. A method as claimed in claim 14 wherein the mixture to be treated contains a chlorine-containing or bromine-containing disilane and 1 to 30 weight percent of a monoorganosilane of formula $R'SiX_3$.

16. A method as claimed in claim 15 wherein the mixture to be treated contains a chlorine-containing or bromine-containing disilane and 2 to 20 weight percent of a monoorganosilane of formula $R'SiX_3$.

17. A method as claimed in claim 14 wherein there are from 0 to 40 mole percent $(R_2Si)$ units, 40 to 99 mole percent (RSi). and 1 to 30 mole percent (R'Si) units.

18. A method as claimed in claim 17 wherein there are from 0 to 10 mole percent (R'Si) units, 80 to 99 mole percent (RSi), and 1 to 20 mole percent (R'Si) units.

19. A method as claimed in claim 15 wherein R is a methyl radical and the remaining bonds or silicon are attached to either other silicon atoms or chlorine atoms.

20. A method as claimed in claim 15 wherein the rearrangement catalyst is selected from the group consisting of ammonium halides, tertiary organic amines, quaternary ammonium halides, quaternary phosphonium halides, hexamethylphosphoramide, and silver cyanide.

21. A method as claimed in claim 20 wherein the rearrangement catalyst is present at a level of 0.1 to 2.0 weight percent and is selected from the group consisting of quaternary ammonium halides of general formula $W_4NX'$, quaternary phosphonium halides of the general formula $W_4PX'$, and hexamethylphosphoramide where W is an alkyl or aryl radical and $X'$ is a halogen.

22. A method as claimed in claim 21 wherein the rearrangement catalyst is selected from the group consisting of quaternary ammonium halides of general formula $W_4NX'$ and quaternary phosphonium halides of the general formula $W_4PX'$ where W is an alkyl radical contain 1 to 6 carbon atoms or a phenyl radical and $X'$ is chlorine or bromine.

23. A method as claimed in claim 22 wherein the rearrangement catalyst is tetra-n-butylphosphonium bromide or tetra-n-butylphosphonium chloride.

24. A method as claimed in claim 19 wherein $R'$ is an alkyl radical containing at least six carbon atoms.

25. A method as claimed in claim 24 wherein $R'$ is an n-hexyl radical.

26. A method as claimed in claim 24 wherein $R'$ is an n-hexyl radical.

27. A method as claimed in claim 19 wherein $R'$ is a phenyl radical.

28. A method as claimed in claim 19 wherein $R'$ is a radical of the formula $A_yX_{(3-y)}Si(CH_2)z-$ wherein each A is independently selected from a hydrogen atom or alkyl radicals containing 1 to 4 carbon atoms, y is an integer equal to 0 to 3, X is chlorine or bromine, and z is an integer greater than or equal to 1.

29. A method as claimed in claim 15 wherein the polysilane contains both (n-octyl-Si) units and (phenyl-Si) units.

30. A method as claimed in claim 16 wherein the polysilane contains both (n-octyl-Si) units and (phenyl-Si) units.

31. A method as claimed in claim 19 wherein the polysilane contains both (n-octyl-Si) units and (phenyl-Si) units.

* * * * *

UNITED STATES PATENT AND TRADEMARK OFFICE
CERTIFICATE OF CORRECTION

PATENT NO. : 4,962,176

DATED : October 9, 1990

INVENTOR(S) : Duane R. Bujalski, Gary E. LeGrow, Thomas F. Lim

It is certified that error appears in the above-identified patent and that said Letters Patent is hereby corrected as shown below:

On the title page item [75]:

Inventors: "Gary E. DeGrow" should read --Gary E. LeGrow--.

Signed and Sealed this

Fourteenth Day of July, 1992

*Attest:*

DOUGLAS B. COMER

*Attesting Officer*  *Acting Commissioner of Patents and Trademarks*